Patented Nov. 10, 1953

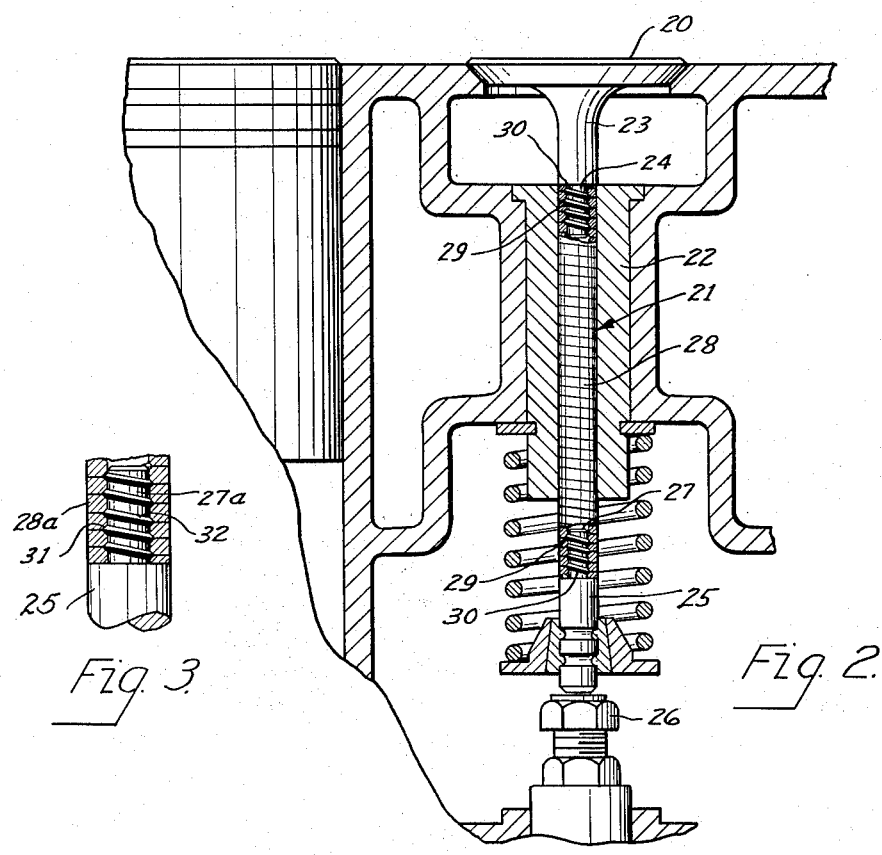
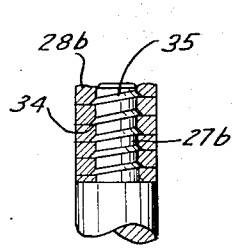
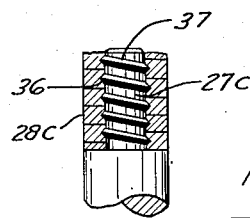

2,658,492

UNITED STATES PATENT OFFICE 2,658,492

POPPET VALVE

William H. Taylor, Mentor-on-the-Lake, Ohio

Application October 25, 1952, Serial No. 316,830

15 Claims. (Cl. 123—188)

This invention relates to a poppet valve and to a poppet valve, guide and seating spring combination for internal combustion engines and particularly to a poppet valve having a stem which is yieldable radially so as to maintain metal to metal contact with the walls of its guide under varying heat conditions and elongatable so as to maintain contact with its operating tappet throughout the entire cycle of operation of the valve.

This application is a continuation-in-part of my copending application, Serial No. 84,137, filed March 29, 1949, now abandoned.

Heretofore in engine valves of this general character provision has been made for the radial yieldability of the valve stem in order to relieve stresses which otherwise would have resulted from the heating of the valve by the exhaust gases discharged from the engine through its port and the resultant expansion of the metal of the stem. The main advantage of radial yieldability is that the valve stem fits its guide without the usual operating clearance and metal to metal contact between the stem and its guide is maintained at all times with consequent rapid dissipation of heat from the stem.

In my U. S. Letters Patent No. 1,959,394, issued May 22, 1934, a valve is shown in which the radial yieldability is obtained by providing in the valve stem one or more longitudinal slots which extend through the axis of the stem so as to divide the stem into a plurality of radially yieldable sections. The valve of my above identified patent provides metal to metal contact between the stem and the valve guide and due to the rapid dissipation of heat maintains the stem at a lower operating temperature than is normal for solid stem valves so that axial elongation of the stem is considerably reduced. However, the slots do not directly and entirely eliminate the temporary elongation resulting from heating of the stem and accordingly some clearance has to be maintained between the tappet and the lower end of the stem to assure proper and full seating of the valve.

In my later U. S. Letters Patent No. 2,221,657, issued November 12, 1940, a valve with a slotted stem is shown in which four slots are provided, each slot extending in a gradual spiral endwise of the stem and about ninety degrees circumferentially thereof. This valve has advantages as to radial yieldability but affords no noticeable resilient elongatability.

In the valve of the present invention, provision is made for both radial yieldability and elastic elongatability, of the stem, the former so that the valve stem can dissipate heat rapidly by metal to metal contact with the guide and the latter so that, at the same time, the end of the stem can maintain contact with its tappet in all operating positions of the valve.

Furthermore, in the present valve, the stem is of considerably larger diameter relative to the diameter of the head than in my prior valves and thus affords a large external heat radiating surface for contact with the guide. Also, since the stem is hollow, the heat is maintained where it can most readily be transmitted to or exchanged with the guide. Also, the stem provides a pumping action for maintaining effective lubrication. Again, the valve of the present invention is one which may be made more economically than the slotted valves disclosed in my prior patents.

Another advantage of the valve is that the head can accommodate itself to the port seat even though the port seat and the guide are slightly eccentric or out of line with respect to each other.

The present valve may be used both as an intake valve and as an exhaust valve.

Other objects and advantages of the present invention will become apparent from the following description wherein reference is made to the drawings, in which:

Figure 2 is a view similar to Figure 1 illustrating a modification in the stem of the valve;

Figure 3 is a fragmentary enlarged axial sectional view through a portion of the spring stem of the valve and rigid stem portion or shank, showing a threaded connection therebetween; and Figures 4 and 5 are views similar to Figure 3 showing modifications of the threaded connection.

Figure 1:
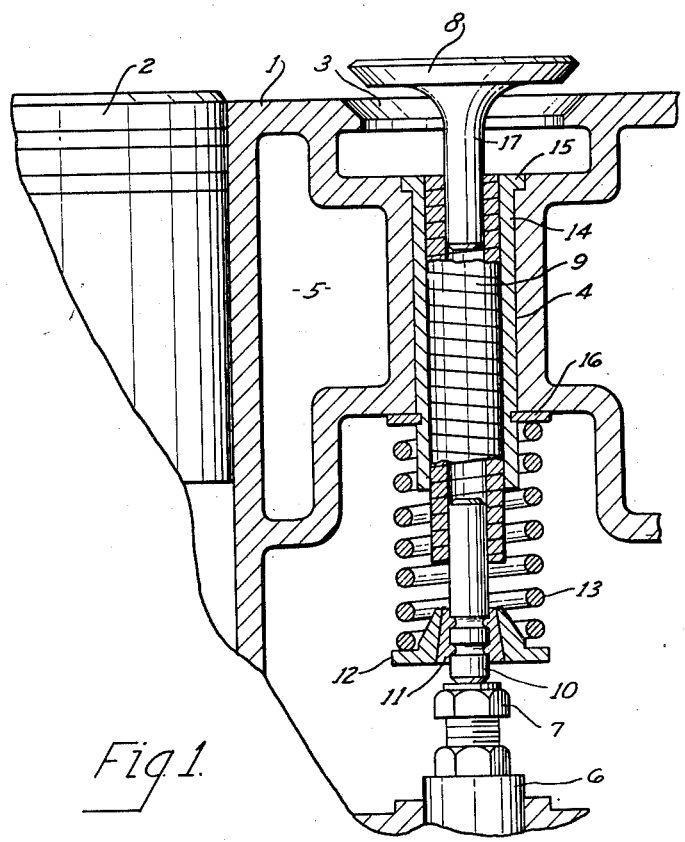
Figure 1 is a sectional view through an automobile engine with a valve, guide, and seating spring combination embodying the present invention installed therein, part of the valve and seating spring and keeper being shown in section for clearness in illustration.

As there illustrated, the engine block 1 is provided with the usual piston 2, valve port 3 and bore 4 for receiving the usual valve guide. The block has the usual water jacket 5 which surrounds the cylinder and the portion of the block through which the bore 4 extends. The engine is also provided with a tappet 6 which has an adjustable head 7 adapted to engage and lift the valve from its seat. The structure thus described is well known in automobile and other internal combustion engines, though in some instances the water jacket is omitted and provision is made for air cooling the various parts of the block and in others the valve tappet is in the form of a rocker arm.

Referring to the valve, with which the present invention is particularly concerned, the valve comprises a head 8 adapted for cooperation with a seat in the port 3, a stem 9 adapted to be received in the valve guide, and a stem portion or shank 10 adapted to receive the usual locking collar 11 and keeper 12 which latter cooperates with the seating spring 13. The lower end of the shank 10 of the stem is adapted to engage the upper surface of the adjustable head 7 of the tappet 6 for lifting the valve.

The main portion of the stem 9 is in the form of a coil spring, preferably a closed coil spring, that is, one in which the end faces of adjacent convolutions are normally in firm resilient contact with each other. The cross section of each convolution is preferably substantially square or rectangular. The stem 9 operates in a guide 14 which fits into the bore 4. The guide 14 preferably is somewhat longer than the bore 4. In the form illustrated the guide 14 is forged from a single piece of seamless tube and has a flange 15 at its upper end for preventing it from dropping downwardly through the bore 4. At its lower end the guide 14 is provided with a peripheral groove in which a spring snap washer 16 is secured and when so secured engages the under surface of the engine block at the base of the bore 4 thus cooperating with the flange for anchoring the guide firmly in place. The main or spring portion of the stem is preferably of greater length than the guide 14 and is so arranged relative to the head that its upper end is at the upper end of the guide when the head 8 is seated.

The head 8 is provided with a solid stem portion 17 which fits within the upper end of the stem 9. Correspondingly, the upper end of the shank 10 fits into the lower end of the stem 9. The head 8 and its stem portion 17 preferably are formed by forging and centerless grinding in the usual manner or the same may be of the rarer metal alloys and cast integral with each other. Many of such alloys now available are of high heat resistance and can withstand as much as 6,000° Fahrenheit.

The shank 10 may be of machine steel such as 31–20 or 31–40 or austenetic steel such as 21–12. It is air hardened and centerless ground. The upper end of the shank 10 and the stem portion 17 are secured in the spring stem 9 by fuse welding or silver soldering. The spring preferably is of a chromium nickel steel, for example, a steel alloy containing 18 parts chrome and 8 parts nickel, this type of alloy being commonly referred to in the trade as type 302 or 304 stainless steel. However, oil tempered carbon steel of 55 to 70 points carbon is very satisfactory for the spring. The shank 10 and stem portion 17 can be fuse welded or silver soldered to this metal without destroying the spring tension thereof.

As explained, the outer diameter of the stem 9 is considerably larger than the normal size stem for a given diameter valve head. The diameter of the stem 9 relative to the bore of the guide 14 is such that when cold or at room temperature the stem 9 fits the guide with a push fit so that at all times it operates in metal to metal contact with the guide walls. As explained, the valve is seated by the usual spring 13. However, for proper operation it is desirable that the spring 13 apply a pull on the valve stem greater than that required to elongate the stem 9 axially by separating its convolutions from each other. For example, if the spring 13 is adapted to exert a pull on the stem of about 65 pounds, the stem 9 may be such that its convolutions tend to separate from each other under a pull of about 45 pounds. Thus, when the head 8 is seated on the seating area of the port 3, the stem portion 9 is resiliently elongated by the force of the spring 13. Since the spring 13 is placed in operating position under a considerable degree of compression it elongates the stem 9 sufficiently to cause the seating of the lower end of the shank 10 on the upper surface of the head 7 of tappet in all operating positions of the tappet.

In order to adjust the valve for proper operation, the engine is turned over by hand until the head 8 is fully seated and the tappet is fully retracted. A feeler for the normal or desired clearance is inserted between the head of the tappet and the end of the shank 10. The thickness of the feeler should be very slightly greater than the normal elongation of the stem under heat. The head 7 of the tappet is then adjusted upwardly just to the point at which the slack is taken out of the stem 9 so that the convolutions of the stem are firmly together and the head seated. Thereupon, the feeler is removed and the bottom of the shank 10 comes to rest on the upper surface of the head 7 of the tappet due to elastic elongation of the stem 9 by the action of the spring 13. Thus with the valve fully closed and the tappet in its retracted position the convolutions of the spring stem 9 are very slightly separated, this separation being distributed along the spring stem 9. Since this amount of separation is about equal to or slightly greater than the total elongation which would result from the heating of the valve stem, any heating thereof which would result in elongation is compensated for by the closing of the spaces between the adjacent convolutions of the stem 9. If it should happen that a wider gap than normal were left between the head 7 of the tappet and the bottom of the shank 10, the shank 10 will still ride on the tappet, though of course, a very slight delay in opening of the valve will occur as it will not open until all the spaces between the convolutions of the stem 9 have been closed.

Since the stem 9 does not heat up to as high a temperature as does the ordinary solid steel stem valve, the allowance for clearance between the lower end of the stem shank 10 and the head 7 of the tappet during adjustment usually is less than normal for a solid stem valve as the axial elongation of the stem is less under the lesser temperature.

Thus at all times the valve rides on the tappet yet seats properly. As a result any shock which would normally occur due to the tappet striking the lower end of the stem is eliminated and instead any shock due to the tappet changing its direction of reciprocation is absorbed or cushioned by the spring action of the stem. Furthermore, the stem 9, due to the pumping action resulting from the opening and closing of the spaces between the convolutions, and the capillarity of such spaces, distributes oil along the contacting walls of the guide and stem.

Since the stem is hollow, the heat entering the stem is maintained closer to the guide wall than would be the case were the stem solid and hence is transmitted more rapidly to the guide. Likewise, since there is a tendency for the spring portion of the stem to become reduced in diameter when it is elongated by the force of the seating spring and to return to its original diameter when the force of the seating spring is relieved by the lifting of the valve by the tappet, any tendency of the valve to stock in the guides is eliminated or reduced. Furthermore, since the expansion of the spring portion of the stem under heat tends to travel longitudinally due to the convolutions the radial expansion of the stem where it fits in the guide is very greatly reduced.

The valve is particularly adapted for internal combustion engines but may be used to advantage in steam engines, air compressors or in any other device in which quiet and accurate poppet valve operation is desired.

Referring next to Figures 2 through 5, a modification of the valve is illustrated. The modified form is similar to that illustrated in Figure 1, except for the fact that the stem is of constant external diameter from adjacent the head to the shank and the shank and rigid stem portion of the head are connected to the spring differently.

As illustrated in Figures 2 through 5, the valve comprises a head 20, corresponding to the head 8 heretofore described, and a stem, indicated generally at 21, which is received in a guide 22 for supporting and guiding the valve during operation. The head portion 20 has a rigid stem portion 23 which at its lower end has a reduced diameter portion 24. The stem also is provided at its lower end with a rigid shank 25 adapted to be engaged and disengaged by the tappet 26 for opening and closing the valve. The shank 25 has a reduced diameter portion 27 at its upper end.

The intermediate portion of the stem, indicated at 28, is in the form of a closed coil spring and the portions 24 and 27 of the stem portion 23 and shank 25 are telescopically received in the opposite ends of the spring 28.

The spring 28, beginning at opposite ends and extending part way of its length is provided with internal threads 29 which are engaged by complementary external threads, indicated at 30, on the portions 24 and 27, respectively. These threads firmly engage for holding the valve in assembled condition, but, if desired, the threaded connection between the spring and the threaded portions 24 and 27 may be additionally reinforced by spot welding, braising, and the like.

Referring next to Figures 3 to 5, various types of cooperating threads are shown on an enlarged scale, these being shown only for the portion 27 of the shank in Figures 3 through 5, as the same type of thread is used for the portion 24 at the opposite end of the spring 28. In Figures 3 through 5, parts corresponding to those in Figure 2 are designated by the suffixes a, b and c respectively. As shown in Figure 3, the internal thread 31 is provided by beveling both internal edges of the stock forming the convolution, complementary threads 32 are provided on the portion 27a. In Figure 4 an internal thread 33 is provided in the spring, this being obtained by beveling only one of the internal edges of the convolutions, preferably the lower edge so that the flat upwardly facing thread face 34 is provided. The shank portion 27b has a complementary thread 35. In Figure 5, internal threads 36 are provided in the spring 28c, these being in the form of a groove parallel to the length of the convolutions and preferably spaced from the upper and lower edges of each convolution. The resulting thread is engaged by complementary threads 37 on the shank portion 27c.

The form shown in Figure 5 has an advantage in that the thread engagement eliminates any tendency towards separation of the convolutions of the spring endwise at the location in which they are secured to the telescoped portions of the rigid stem such as indicated at 24 and 27 in Figure 1, or shank, respectively.

Having thus described my invention, I claim:

1. In combination, a poppet valve comprising a head, an elastically elongatable head supporting and guiding stem operative to elongate readily under a predetermined pull endwise of the stem, a guide for reciprocably supporting the stem, a shank coaxial with and fixedly connected to the stem, a seating spring operable to exert an endwise pull on the valve stem greater than the pull required to elastically elongate said stem, and means for operatively connecting the seating spring with the shank.

2. In an engine having a port with a seat and a guide coaxial with said port, a poppet valve comprising a head, an elastically elongatable head supporting and guiding stem connected at one end to the head and reciprocable in the guide to open and close said port, a shank on the other end of the stem, a seating spring operatively connected to the shank and urging the valve head to seating position, said spring exerting an axial pull on the shank of the stem sufficiently great to elastically elongate the stem, and a reciprocable tappet engaging the shank for moving the valve toward open position in opposition to the seating spring.

3. The structure according to claim 2 characterized in that said shank is held by said spring in continuous contact with the tappet in all operating positions of the valve.

4. In an automobile engine having a block with a port therein, a guide coaxial with said port, a valve having an elastically elongatable head supporting and guiding stem reciprocable in the guide and a head carried by the stem at one end and coaxial with the stem for opening and closing said port, said stem having a shank extending beyond the end of the guide opposite from the head, a coiled compression spring coaxial with the stem and operatively interposed between the block and the shank of the stem for resiliently urging the stem axially of the guide in the direction for seating the head, a tappet engaging the shank and operative to move the valve to open position, and said spring having sufficient compression when the valve head is seated to resiliently elongate said stem an amount greater than normal tappet clearance.

5. In combination, a poppet valve comprising a head and an elastically elongatable head supporting and guiding stem of which a portion is a coil spring, a guide snugly embracing and supporting and guiding said portion of the stem for reciprocation axially of the spring, and a seating spring operatively connected to the stem for exerting an axial pull on the stem in a direction away from the head.

6. A poppet valve comprising a head, a head supporting and guiding stem coaxial with, and connected at one end to the head, said stem having a shank portion at its opposite end, said shank portion being adapted for connection to a seating spring, and for operative connection to a valve operating tappet, said stem having a portion intermediate the head and shank portion adapted to fit within a tubular valve guide and support and guide the valve for axial reciprocation, and said intermediate portion having at least a portion in the form of an elastically elongatable coil spring which is coaxial with the head and which, at one end, is fixedly connected to the shank portion and at the other end is secured in fixed position relative to the head.

7. A poppet valve according to claim 6 characterized in that said shank is adapted for connection to a seating spring by having a keeper groove extending substantially circumferentially thereof for interengagement with a keeper key of a keeper and seating spring combination.

8. A poppet valve according to claim 6 characterized in that the stem is of uniform diameter throughout the portion of its length beginning adjacent the head and extending to the shank.

9. A poppet valve according to claim 6 characterized in that said spring is a closed coil spring.

10. A poppet valve according to claim 7 characterized in that the cross sections of individual convolutions of the spring are substantially rectangular, respectively.

11. A poppet valve comprising a head, a head supporting and guiding stem coaxial with, and connected at one end to, the head, said stem having a shank portion at its opposite end, adapted for connection to a seating spring, and said shank portion having an end surface on its outermost end for engagement by a tappet for moving the valve axially to open position and for disengagement by the tappet for releasing the valve for return to closed position, said stem having a portion intermediate the head and shank portion adapted to fit within a tubular valve guide and supporting and guiding the valve for axial reciprocation, and said intermediate portion having at least a portion in the form of an elastically elongatable coil spring which is coaxial with the head and which, at one end, is fixedly connected to the shank portion and at the other end is secured in fixed position relative to the head.

12. A poppet valve comprising a head, a head supporting and guiding stem coaxial with, and connected at one end to, the head, said stem having a shank portion at its opposite end, adapted for connection to a seating spring and said shank portion having an end surface on its outermost end for engagement by a tappet for moving the valve axially to open position and for disengagement by the tappet for releasing the valve for return to closed position, said stem having a portion intermediate the head and shank portion adapted to fit within a tubular valve guide for supporting and guiding the valve for axial reciprocation, and said intermediate portion being elastically elongatable readily axially of the stem, and fixedly connected at one end to the shank and at the other end secured in fixed position relative to the head.

13. A poppet valve comprising a head having a rigid stem portion coaxial therewith, a rigid shank, a coil spring, one end portion of the shank being telescopically received in and connected to one end of the spring, one end portion of the rigid stem portion being telescopically received in and connected to the other end of the spring, the inner ends of the stem portion and rigid shank being spaced apart endwise from each other so that a portion of the spring intermediate the inner ends of the shank and rigid stem portion is elastically elongatable, said spring being adapted to fit within a tubular valve guide, with its outer surface exposed to the guide wall and in contact therewith for supporting and guiding the valve for axial reciprocation to open and closed positions, the shank being adapted for operative connection to a tappet for operating the valve by the tappet from closed to open position and for permitting the valve to return to closed position, and said shank being adapted for connection to the keeper of a seating spring and keeper combination.

14. A poppet valve according to claim 13 characterized in that the convolutions of the spring beginning at each end of the spring and extending at least partway of the length of the spring have at least one internal edge beveled thereby providing helical internal threads adjacent the respective ends of the spring, and those portions of the rigid stem portion and of the shank which are telescopically received in the spring have external threads complementary to and engageable with the internal threads at their associated ends of the spring, respectively.

15. A poppet valve according to claim 13 characterized in that the convolutions of the spring beginning at each end of the spring and extending at least partway of the length of the spring has internal grooves which provide helical internal threads adjacent the respective ends of the spring, and those portions of the rigid stem portion and of the shank which are telescopically received in the spring have external threads complementary to and engageable with the internal threads at their associated ends of the spring, respectively.

WILLIAM H. TAYLOR.

References Cited in the file of this patent

UNITED STATES PATENTS

| Number | Name | Date |
| --- | --- | --- |
| Re. 14,287 | Knudsen | Apr. 17, 1917 |
| 875,297 | Stanley | Dec. 31, 1907 |
| 876,439 | Crossley et al. | Jan. 14, 1908 |
| 1,056,518 | Edand | Mar. 18, 1913 |
| 1,670,839 | Butz | May 22, 1928 |

FOREIGN PATENTS

| Number | Country | Date |
| --- | --- | --- |
| 23,776 | Great Britain | Oct. 25, 1906 |
| 20,138 | Great Britain | June 20, 1911 |
| 434,838 | France | Feb. 14, 1912 |